US012663036B2

(12) United States Patent
Dozier

(10) Patent No.: US 12,663,036 B2
(45) Date of Patent: Jun. 23, 2026

(54) FASTENER ASSEMBLY

(71) Applicant: Schneider Electric USA, Inc.,
Andover, MA (US)

(72) Inventor: Steven Wayne Dozier, Murfreesboro,
TN (US)

(73) Assignee: Schneider Electric USA, Inc., Boston,
MA (US)

( * ) Notice: Subject to any disclaimer, the term of this
patent is extended or adjusted under 35
U.S.C. 154(b) by 56 days.

(21) Appl. No.: 18/538,305

(22) Filed: Dec. 13, 2023

(65) Prior Publication Data

US 2025/0198445 A1    Jun. 19, 2025

(51) Int. Cl.
*F16B 21/07* (2006.01)

(52) U.S. Cl.
CPC ................................. *F16B 21/073* (2013.01)

(58) Field of Classification Search
CPC .................................................. F16B 21/0734
See application file for complete search history.

(56) References Cited

U.S. PATENT DOCUMENTS

| | | | | |
|---|---|---|---|---|
| 2,252,286 A | * | 8/1941 | Hathorn | ..................... F16B 5/10 411/352 |
| 2,853,112 A | | 9/1958 | Poupitch | |
| 3,037,542 A | * | 6/1962 | Boyd | ........................ F16B 5/10 411/964 |
| 3,896,698 A | * | 7/1975 | Aylott | ................... F16B 21/073 411/548 |
| 4,078,471 A | | 3/1978 | Archibald et al. | |
| 4,276,806 A | | 7/1981 | Morel | |
| 4,621,961 A | * | 11/1986 | Gulistan | ............... F16B 41/002 411/533 |
| 4,732,519 A | * | 3/1988 | Wagner | ................... F16B 35/04 403/14 |

(Continued)

FOREIGN PATENT DOCUMENTS

| | | |
|---|---|---|
| DE | 102006004678 B4 | 9/2009 |
| EP | 2362107 A2 | 8/2011 |

(Continued)

OTHER PUBLICATIONS

Extended European Search Report dated May 9, 2025 for corresponding European Patent Application No. EP24215321.1, 9 pages.

*Primary Examiner* — David M Upchurch
(74) *Attorney, Agent, or Firm* — Kinney & Lange, P.A.

(57) ABSTRACT

A fastening assembly for attaching a first structure to a second structure located at least partially behind the first structure can include a clip configured to insert into an opening in the first structure in an axial direction. The clip can be configured to engage the first structure when inserted into the opening of the first structure in the axial direction such that the clip is configured to be axially retained to the first structure, the clip defining a passthrough channel. The assembly can include a fastener configured to insert through the passthrough channel to extend beyond the clip in the axial direction to mate with a mating portion of the second structure. The clip and fastener can be configured such that the clip axially limits a motion of the fastener when the fastener is advanced through the passthrough channel beyond a threshold insertion position to captively retain the fastener and prevent backing out of the fastener.

19 Claims, 5 Drawing Sheets

(56)                References Cited

U.S. PATENT DOCUMENTS

| | | | | |
|---|---|---|---|---|
| 4,877,364 | A | 10/1989 | Sorrentino | |
| 4,952,107 | A * | 8/1990 | Dupree | F16B 5/0208 |
| | | | | 411/103 |
| 5,020,951 | A | 6/1991 | Smith | |
| 5,094,579 | A | 3/1992 | Johnson | |
| 5,785,449 | A * | 7/1998 | DiBene | H05K 7/1407 |
| | | | | 411/105 |
| 5,807,052 | A * | 9/1998 | Van Boven | F02F 1/24 |
| | | | | 411/537 |
| 5,871,319 | A | 2/1999 | Schneider | |
| 6,238,127 | B1 * | 5/2001 | Jhumra | F16C 17/10 |
| | | | | 384/295 |
| 6,394,724 | B1 | 5/2002 | Kelly et al. | |
| 6,736,578 | B2 | 5/2004 | McIninch | |
| 6,761,521 | B2 | 7/2004 | McCormack et al. | |
| 7,001,128 | B2 * | 2/2006 | Kuntze | F16B 5/0642 |
| | | | | 24/297 |
| 7,179,037 | B2 * | 2/2007 | Aukzemas | F16B 41/002 |
| | | | | 411/352 |
| 7,278,809 | B2 | 10/2007 | Aukzemas et al. | |
| 7,895,709 | B2 * | 3/2011 | Shishikura | F16B 37/043 |
| | | | | 411/335 |
| 7,905,696 | B2 * | 3/2011 | Chiu | F16B 5/0208 |
| | | | | 411/107 |
| 8,142,485 | B2 * | 3/2012 | Buhren | A61B 17/8057 |
| | | | | 606/289 |
| 8,794,889 | B2 | 8/2014 | Aukzemas et al. | |
| 10,161,430 | B2 | 12/2018 | He | |
| 11,118,478 | B2 | 9/2021 | Mancini et al. | |
| 11,566,647 | B2 | 1/2023 | Corey et al. | |
| 2002/0197134 | A1 * | 12/2002 | Huber | F16B 21/02 |
| | | | | 81/176.15 |
| 2017/0284437 | A1 * | 10/2017 | Landsberg | F16B 5/0642 |

FOREIGN PATENT DOCUMENTS

| | | | |
|---|---|---|---|
| GB | 190912563 | A | 5/1910 |
| GB | 1152880 | A | 5/1969 |

* cited by examiner

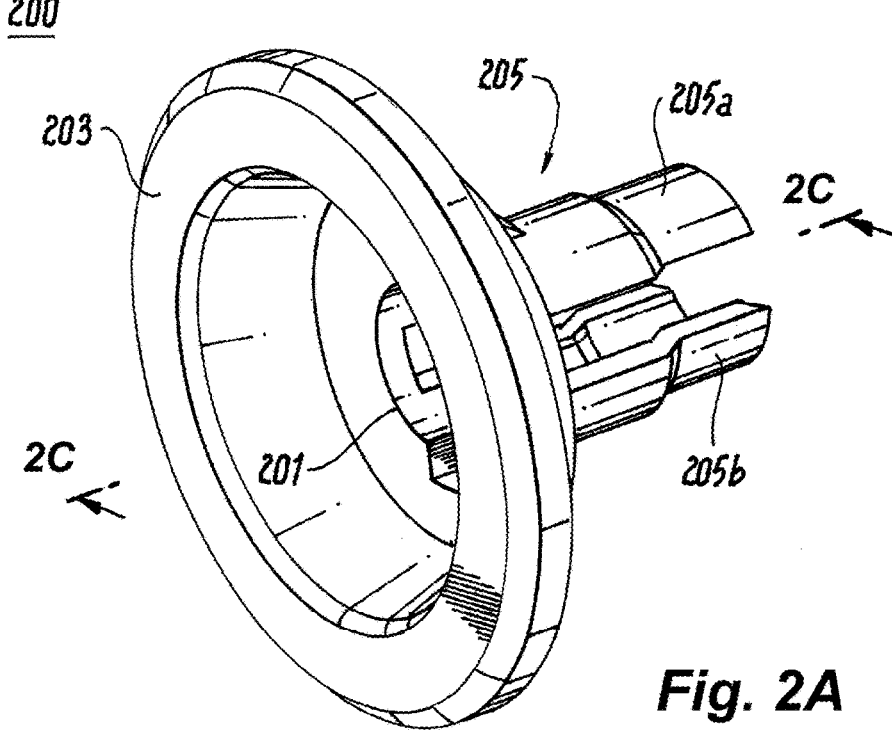
Fig. 2A
Fig. 2B
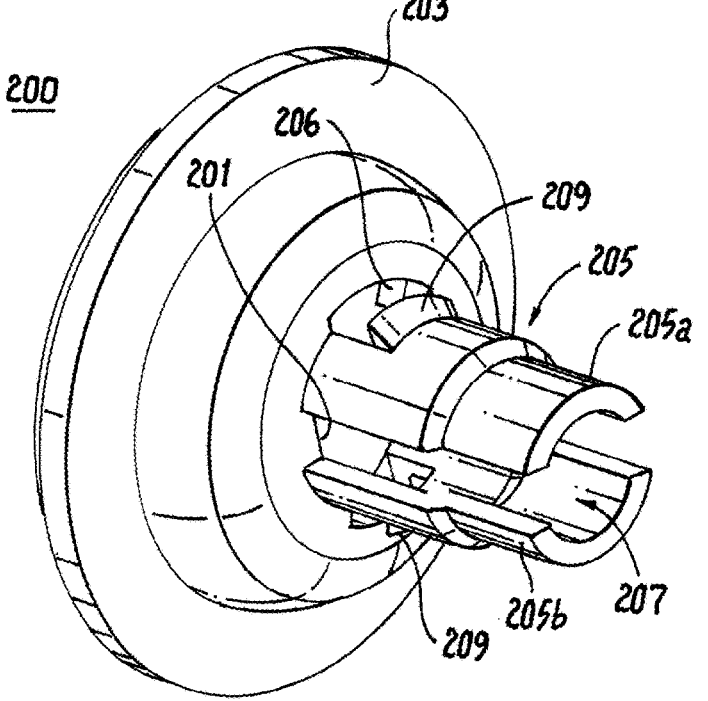

FASTENER ASSEMBLY

FIELD

This disclosure relates to fastener assemblies.

BACKGROUND

Traditionally, certain electrical panel covers have recess where a user will simply insert a screw and try to align it with a female hole in the interior structure. However, panel cover holes and female screw holes in the interior structure can be misaligned, making insertion of screws difficult. Additionally, loose screws and cover holes can fall between the panel cover and the interior structure.

Conventional methods and systems have generally been considered satisfactory for their intended purpose. However, there is still a need in the art for improvements. The present disclosure provides a solution for this need.

SUMMARY

A fastening assembly for attaching a first structure to a second structure located at least partially behind the first structure can include a clip configured to insert into an opening in the first structure in an axial direction. The clip can be configured to engage the first structure when inserted into the opening of the first structure in the axial direction such that the clip is configured to be axially retained to the first structure, the clip defining a passthrough channel. The assembly can include a fastener configured to insert through the passthrough channel to extend beyond the clip in the axial direction to mate with a mating portion of the second structure. The clip and fastener can be configured such that the clip axially limits a motion of the fastener when the fastener is advanced through the passthrough channel beyond a threshold insertion position to captively retain the fastener and prevent backing out of the fastener.

In certain embodiments, the clip can include a base portion and a snap-fit shaft extending from the base portion in the axial direction. The base portion can be configured to abut the first structure at the opening in the first structure, and the snap-fit shaft can be configured to extend through the opening in the first structure to extend beyond the first structure in the axial direction.

In certain embodiments, the snap-fit shaft can include a first leaf-spring member and a second leaf-spring member separated by one or more slots (e.g., axially defined slots) to allow the first leaf-spring member and second leaf-spring member to flex relative to each other. In certain embodiments, the snap-fit shaft can include an outer ramp formed from and/or extending outwardly from each of the first and second leaf spring member. Each outer ramp can be configured to contact the first structure when inserted through the opening to cause respective leaf spring members to flex inwardly when inserted through the opening.

In certain embodiments, each outer ramp can be positioned to allow a respective leaf spring member to snap outwardly when each ramp is advanced beyond the first structure. In certain embodiments, each outer ramp has a slope defining a proximal wall, and a pocket can be formed between the proximal wall of each outer ramp and the base portion. The pocket can be configured to receive a wall of the first structure to secure the clip to the wall.

In certain embodiments, the snap-fit shaft can include a reducing inner dimension between a proximal portion and a distal portion such that the snap-fit shaft includes at least a first inner dimension and a second inner dimension located distal of the first inner dimension. The second inner dimension can be smaller than the first inner dimension.

In certain embodiments, the fastener can include a head, a shank portion having a first outer dimension, and a distal end portion having a second outer dimension. The second outer dimension can be larger than the second inner dimension such that insertion of the fastener through the snap-fit shaft causes an outward flex of the snap-fit shaft until the fastener is moved to or beyond the threshold insertion position. The snap-fit shaft can be configured to move back when the fastener is inserted to or beyond the threshold insertion position to create an axial backstop for the distal end portion of the fastener to captively retain the fastener and prevent backing out of the fastener. For example, the first outer dimension can be equal to or less than the second inner dimension.

In certain embodiments, the head of the fastener can be larger than the passthrough channel and is configured to contact the base portion of the clip at a maximum insertion of the fastener into the passthrough channel. In certain embodiments, the shank portion of the fastener can be longer than the snap-fit shaft such that the shank portion extends beyond the snap-fit shaft in the axial direction.

In certain embodiments, each leaf-spring member can include an inner ramp defined between the first inner dimension and the second inner dimension of the snap-fit shaft. In certain embodiments, each inner ramp can be distally located relative to the outer ramp.

In certain embodiments, the distal portion of the fastener can include a distally extending ramp shape configured to contact the inner ramp of each leaf spring member. In certain embodiments, the fastener can include threading on the distal portion proximal to the distally extending ramp shape configured to mesh with receiving threads of the mating portion of the second structure. The shank portion and/or the distally extending ramp shape can be smooth.

In certain embodiments, the base portion of the clip can include a bowl shape conformal to a recess in the first structure. In certain embodiments, the clip can be made of a flexible and/or electrically insulating material. In certain embodiments, the fastener can be made of metal.

In accordance with at least one aspect of this disclosure, a clip for a fastening assembly can be configured to insert into an opening in a first structure in an axial direction. The clip can be configured to engage the first structure when inserted into the opening of the first structure in the axial direction such that the clip is configured to be axially retained to the first structure, the clip defining a passthrough channel. The clip can be configured to axially limit a motion of a fastener when a fastener is advanced through the passthrough channel beyond a threshold insertion position to captively retain the fastener and prevent backing out of the fastener. The clip can be or include any suitable clip or portion thereof disclosed herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 2A is a perspective view of an embodiment of a clip of the assembly of FIG. 1A;

FIG. 2B is a rear perspective view of the embodiment of FIG. 2A;

DETAILED DESCRIPTION

Figure 1A:
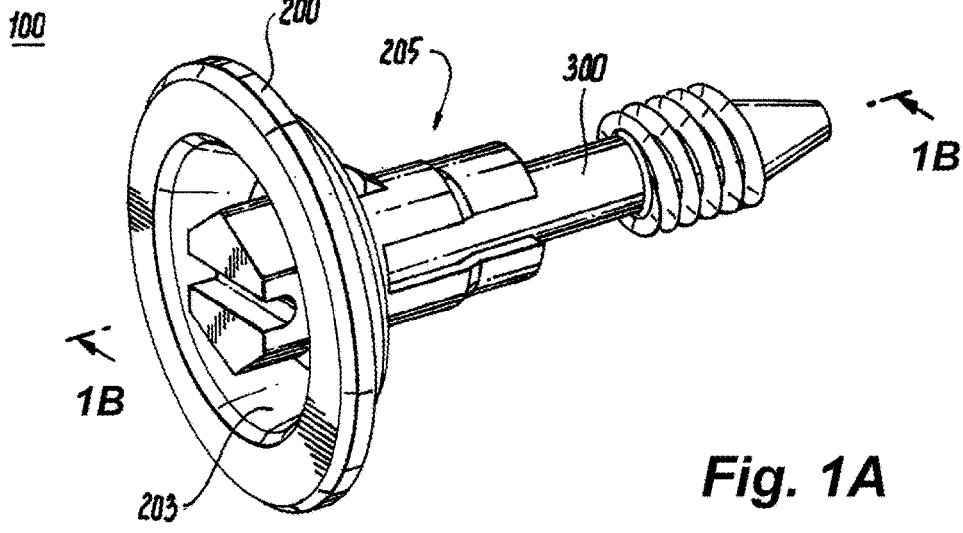
FIG. 1A is a perspective view of an embodiment of a fastening assembly in accordance with this disclosure.

Reference will now be made to the drawings wherein like reference numerals identify similar structural features or aspects of the subject disclosure. For purposes of explanation and illustration, and not limitation, an illustrative view of an embodiment of a fastening assembly in accordance with the disclosure is shown in FIGS. 1A and 1s designated generally by reference character 100. Other views, embodiments, and/or aspects of this disclosure are illustrated in FIGS. 1B-5.

Figure 1B:
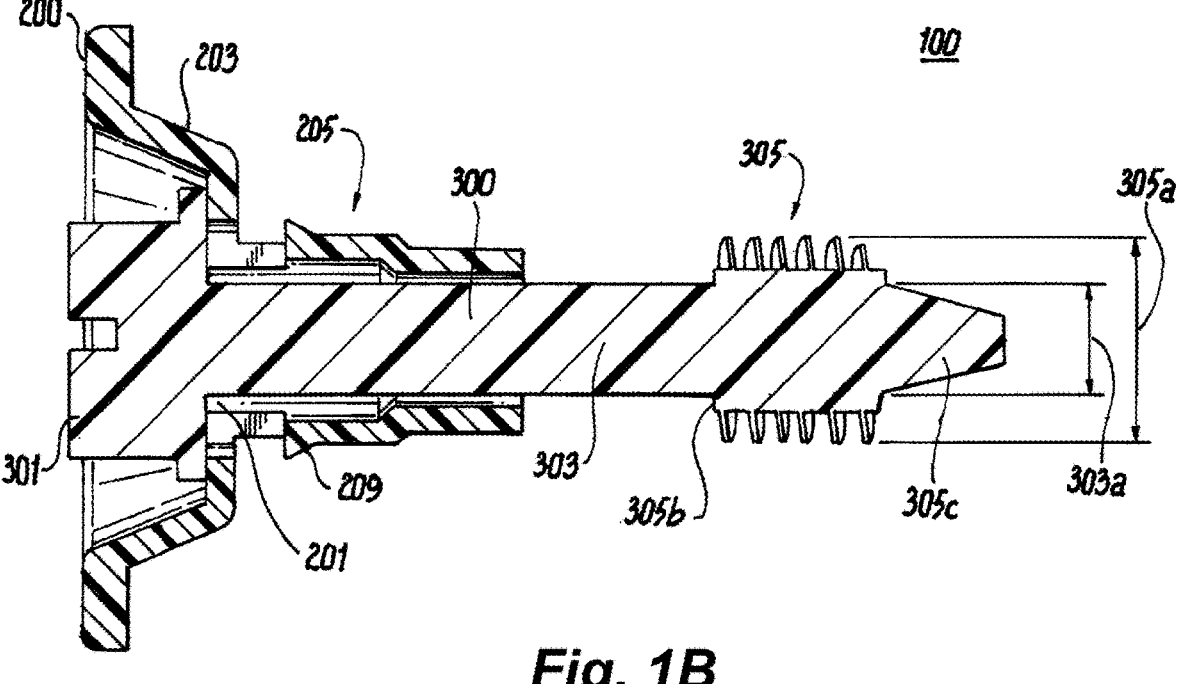
FIG. 1B is a cross-sectional view of the embodiment of FIG. 1A.
Figures 4A, 4B:
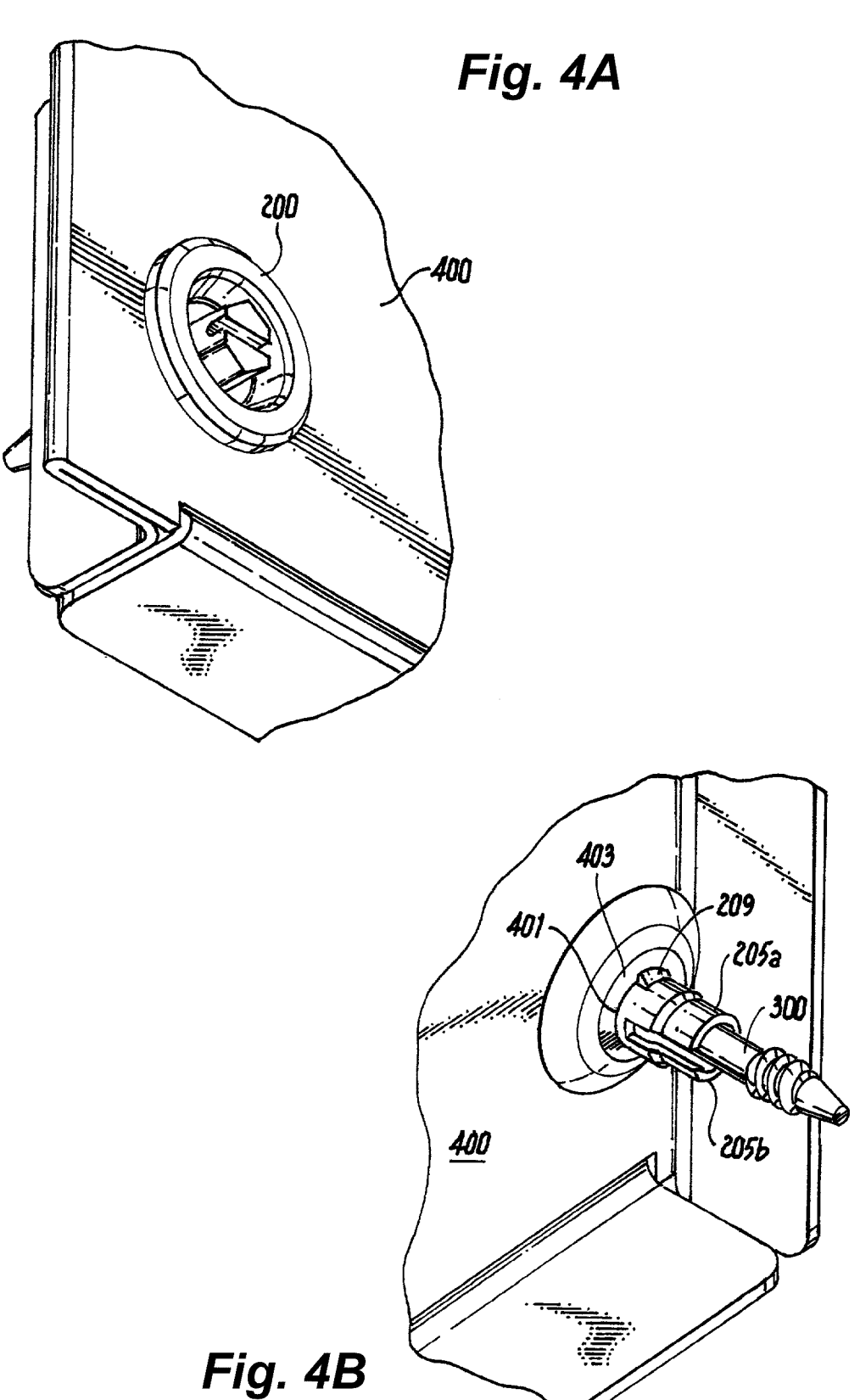
FIG. 4A is a front perspective view of an embodiment of a first structure in accordance with this disclosure, shown having the embodiment of FIG. 1A installed therein.
FIG. 4B is a rear perspective view of the embodiment of FIG. 4A.
Figure 5:
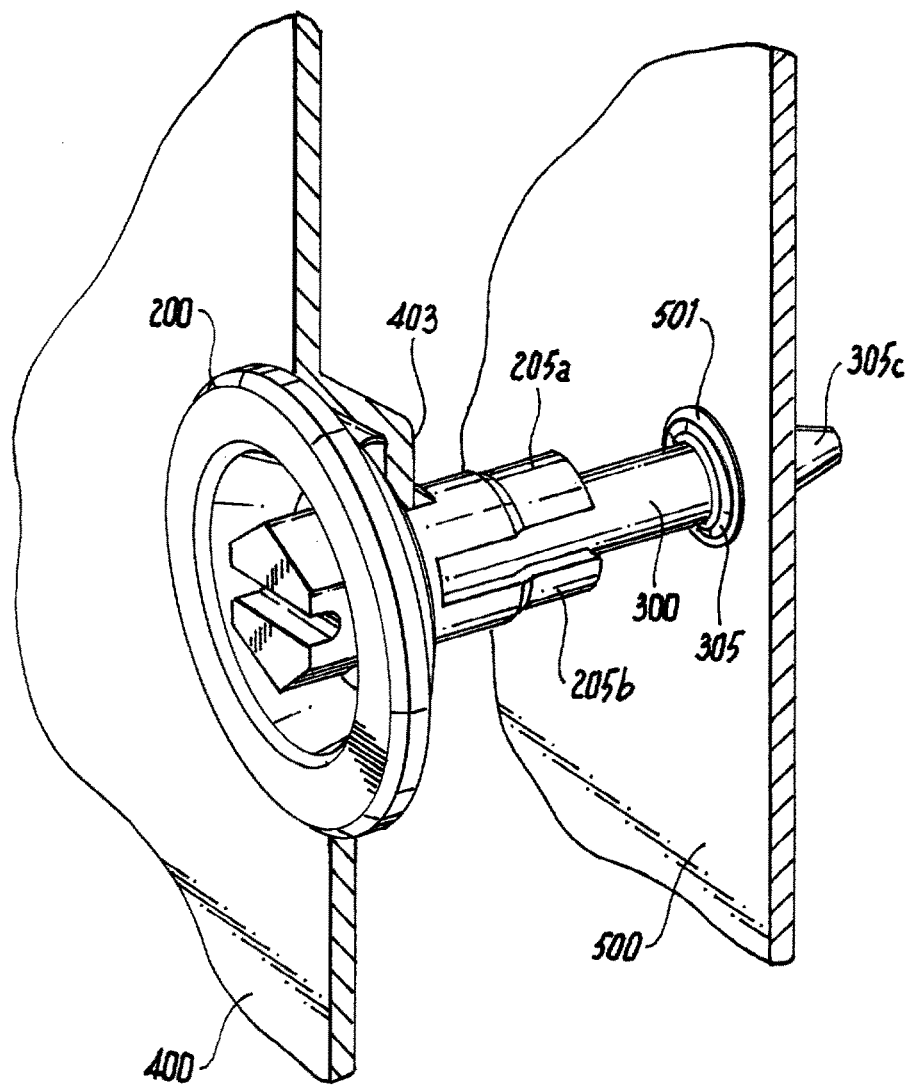
FIG. 5 is a perspective internal view of an embodiment of an arrangement in accordance with this disclosure, showing an assembly in accordance with this disclosure attaching a first structure to a second structure.

Referring to FIGS. 1A and 1B, a fastening assembly 100 for attaching a first structure (e.g., a cover 400, e.g., as shown in FIGS. 4A-5) to a second structure (e.g., an electrical assembly housing 500, e.g., as shown in FIG. 5) located at least partially behind the first structure can include a clip 200 configured to insert into an opening (e.g., opening 401 as shown in FIG. 4B) in the first structure in an axial direction (e.g., to the right of the page as shown in FIG. 1B). The clip 200 can be configured to engage the first structure when inserted into the opening of the first structure in the axial direction such that the clip 200 is configured to be axially retained to the first structure. The clip 200 can define a passthrough channel 201.

The assembly 100 can include a fastener 300 configured to insert through the passthrough channel 201 to extend beyond the clip 200 in the axial direction to mate (e.g., via threads or other suitable attachment) with a mating portion (e.g., a female threaded portion or other suitable mating attachment) of the second structure. The clip 200 and fastener 300 can be configured such that the clip 200 axially limits a motion of the fastener 300 when the fastener 300 is advanced through the passthrough channel 201 beyond a threshold insertion position (e.g., as shown in FIGS. 1A and 1B) to captively retain the fastener 300 and prevent backing out of the fastener 300.

Figure 2C:
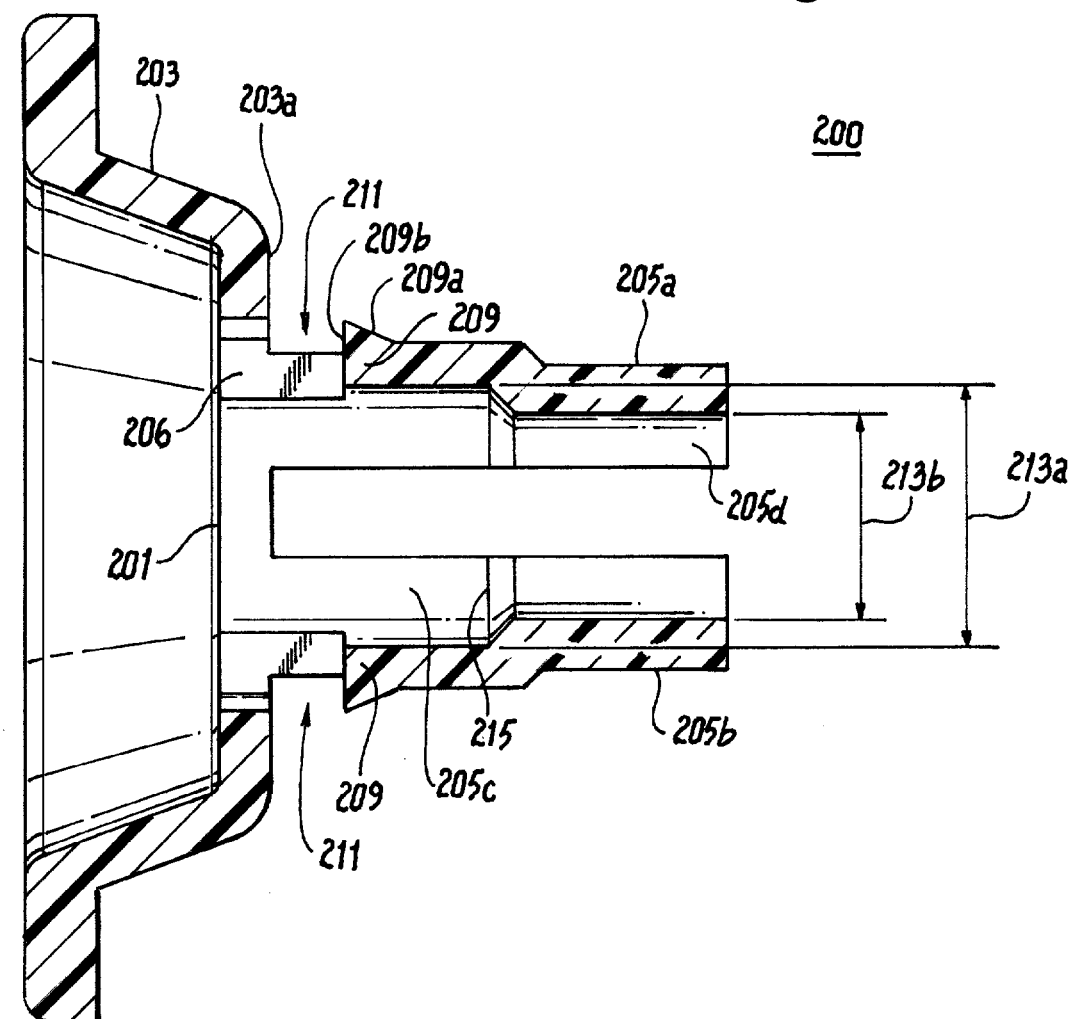
FIG. 2C is a cross-sectional view of the embodiments of FIG. 2A.
Figure 3:
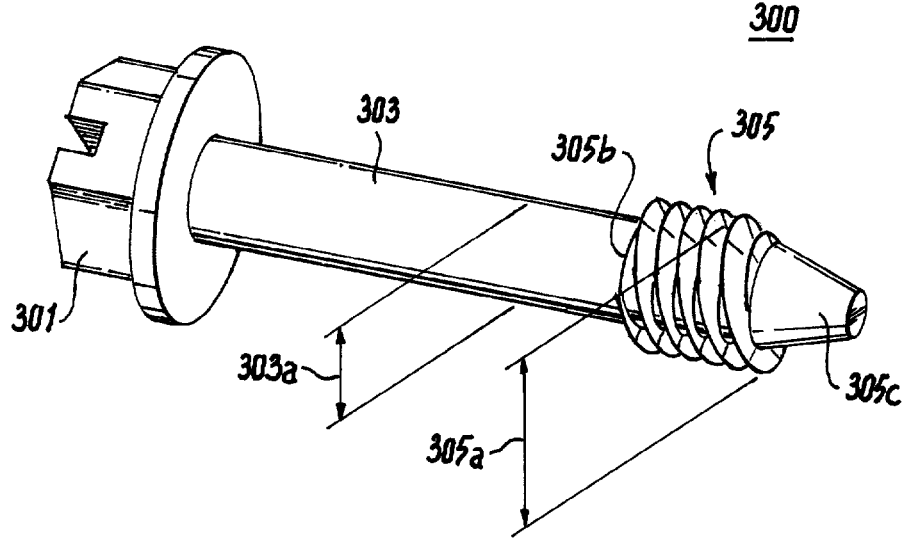
FIG. 3 is a perspective view of the an embodiment of a fastener of the assembly of FIG. 1A.

In certain embodiments, referring additionally to FIGS. 2A, 2B, and 2C, the clip 200 can include a base portion 203 and a snap-fit shaft 205 extending from the base portion 203 in the axial direction. The base portion 203 can be configured to abut the first structure at the opening in the first structure, and the snap-fit shaft 205 can be configured to extend through the opening in the first structure to extend beyond the first structure in the axial direction (e.g., as shown in FIGS. 4B and 5).

In certain embodiments, the snap-fit shaft 205 can include a first leaf-spring member 205a and a second leaf-spring member 205b separated by one or more slots 207 (e.g., axially defined slots as shown) to allow the first leaf-spring member 205a and second leaf-spring member 205b to flex relative to each other. In certain embodiments, the snap-fit shaft 205 can include an outer ramp 209 formed from and/or extending outwardly from each of the first and second leaf spring member 205a, 205b. Each outer ramp 209 can be configured to contact the first structure when inserted through the opening to cause respective leaf spring members 205a, 205b to flex inwardly when inserted through the opening.

In certain embodiments, referring additionally to FIGS. 4A, 4B, and 5, each outer ramp 209 can be positioned to allow a respective leaf spring member 205a, 205b to snap outwardly when each ramp 209 is advanced beyond the first structure 400 (e.g., as shown in FIG. 4B). In certain embodiments, each outer ramp 209 has a slope 209a defining a proximal wall 209b. A pocket 211 can be formed between the proximal wall 209b of each outer ramp 209 and the base portion 203 (e.g., a distal wall 203a of the base portion 203). The pocket 211 can be configured to receive a wall 403 of the first structure 400 to secure the clip 200 to the wall 403 (e.g., having a recess shape to sink the fastener 300). As shown, the base portion 203 and each leaf-spring member 205a, 205b can also have a cut out 206 adjacent the pocket 211 to provide additional flexibility, and/or for more efficient tooling in manufacturing. Certain embodiments do not include the cut out 206. Embodiments can be subtractively manufactured, additively manufactured, or manufactured in any suitable way and/or combination of ways.

In certain embodiments, the snap-fit shaft 205 can include a reducing inner dimension between a proximal portion 205c and a distal portion 205d (e.g., each formed by the first and second leaf-spring members 205a, 205b as shown) such that the snap-fit shaft 205 includes at least a first inner dimension 213a (e.g., an inner radius) and a second inner dimension 213b (e.g., an inner radius) located distal of the first inner dimension 213a. The second inner dimension 213b can be smaller than the first inner dimension 213a as shown. The distal portion 205d can be threaded to received threads from the fastener 300 and/or can be smooth allowing the fastener 300 to push through the distal portion 205d without screwing action.

In certain embodiments, the fastener 300 can include a head 301, a shank portion 303 having a first outer dimension 303a (e.g., an outer radius), and a distal end portion 305 having a second outer dimension 305a (e.g., an outer radius). The second outer dimension 305a can be larger than the second inner dimension 213b such that insertion of the fastener 300 through the snap-fit shaft 205 causes an outward flex of the snap-fit shaft 205 until the fastener 300 is moved to or beyond the threshold insertion position (e.g., as shown in FIG. 1B). The snap-fit shaft 205 can be configured to move back (e.g., elastically return to the position shown in FIGS. 1A-2C) when the fastener 300 is inserted to or beyond the threshold insertion position (e.g., when the distal end portion 305 having the second outer dimension 305a moved past distal end of the distal portion 205d and/or the second inner diameter 213b) to create an axial backstop for the distal end portion 305 of the fastener 300 to captively retain the fastener 300 and prevent backing out of the fastener 300 (e.g., via contact of a proximal wall 305b of the distal end portion 305). For example, the first outer dimension 303*a* can be equal to or less than the second inner dimension 213*b*.

In certain embodiments, the head 301 of the fastener 300 can be larger than the passthrough channel 201 and is configured to contact the base portion 203 of the clip 200 at a maximum insertion of the fastener 300 into the passthrough channel 201 (e.g., as shown in FIG. 1B). In certain embodiments, the shank portion 303 of the fastener 300 can be longer than the snap-fit shaft 205 such that the shank portion 303 extends beyond the snap-fit shaft 205 in the axial direction (e.g., providing some axial play/adjustment room for alignment with the second structure 500).

In certain embodiments, each leaf-spring member 205*a*, 205*b* can include an inner ramp 215 defined between the first inner dimension 213*a* and the second inner dimension 213*b* of the snap-fit shaft 205. In certain embodiments, each inner ramp 215 can be distally located relative to the outer ramp.

In certain embodiments, the distal portion 305 of the fastener 300 can include a distally extending ramp shape 305*c* configured to contact the inner ramp 215 of each leaf-spring member 205*a*, 205*b*. The distally extending ramp shape 305*c* can additionally or alternatively be configured to aid in location of the fastener 300 to the mating portion 501 of the second structure 500, e.g., by guiding the end of the fastener 300 into a hole even where slightly misaligned. In certain embodiments, the fastener 300 can include threading on the distal portion 305 proximal to the distally extending ramp shape 503*c* configured to mesh with receiving threads (e.g., or tapped threads/sheet metal) of the mating portion 501 of the second structure 500. In certain embodiments, the shank portion 303 and/or the distally extending ramp shape 305*c* can be smooth.

In certain embodiments, the base portion 203 of the clip 200 can include a bowl shape conformal to a recess (e.g., formed by wall 403) in the first structure 400. In certain embodiments, the clip 200 can be made of a flexible and/or electrically insulating material (e.g., plastic). In certain embodiments, the fastener 300 can be made of metal. The clip 200 can be configured to allow the fastener 300 to move slightly off axis by flexing action of the snap-fit shaft 205 or a portion thereof to allow a certain amount of axial misalignment of the fastener 300 with the clip 200 to allow mating with misaligned holes in the second structure 500. Any suitable mating structure 501 for any suitable type of fastener 300 is contemplated herein.

In accordance with at least one aspect of this disclosure, a clip 200 for a fastening assembly (e.g., assembly 100) can be configured to insert into an opening 401 in a first structure 400 in an axial direction. The clip 200 can be configured to engage the first structure 400 when inserted into the opening 401 of the first structure 400 in the axial direction such that the clip 200 is configured to be axially retained to the first structure 400. The clip 200 can define a passthrough channel 201. The clip 200 can be configured to axially limit a motion of a fastener (e.g., fastener 300) when the fastener 300 is advanced through the passthrough channel 201 beyond a threshold insertion position to captively retain the fastener 300 and prevent backing out of the fastener 300. The clip 200 can be or include any suitable clip (e.g., clip 200) or portion thereof disclosed herein.

In electrical systems, traditionally, panel covers have a recess where a user simply inserts a screw and tries to align the screw a female hole in the rear structure. However, frequently, screws are dropped into the assembly, and/or the holes do not align such that the screw does not insert into the female hole.

Certain embodiments can include a clip made of a flexible material and/or having one or more flexible features (e.g., for snap insertion and/or fastener insertion and alignment). Certain embodiments can include a wider inner diameter portion and narrower threaded inner diameter portion. A threaded portion of a screw fastener can contact the narrow inner diameter, push it out when axially advancing (e.g., through screwing action or pushing linearly), and then the narrow inner diameter portion can snap back around a narrower shaft of the screw fastener, for example. Certain embodiments can include a tapered down outer diameter to maintain a uniform wall thickness with the inner diameter reduction. The clip can have an overall shape configured to mimic and flushly contact an emboss (e.g., a recess) on the cover panel (e.g., the first structure). Other suitable shapes (e.g., flat) are contemplated herein.

Embodiments of a fastener are dimensioned to include an axial play length and thread advancement distance (e.g., so the fastener is at least long enough to mate with the second structure at its maximum insertion (when bottomed out against the clip). The length can be the length of threaded engagement of the screw with the mounting portion. Certain embodiments can include a ramp for advancing and trapping the clip, which can cause an inward deflection of leaf portions.

Certain embodiments of a fastener include a taper on the distal end for helping the fastener find the hole when it is slightly misaligned. Certain embodiments of a fastener are designed to cut the threads into a sheet metal frame of the second structure, (e.g., a self-tapping screw). A gap between the inner diameter of the clip and the fastener can define how tightly and straight the fastener is held within the clip. Certain embodiments can result in less than about 10 degrees of play relative to the axial direction (e.g., 5 degrees positive or negative, or 10 degrees positive or negative).

Certain embodiments include a plastic clip designed to snap into the cover and ensure that a screw is held captive. Certain embodiments of the clip also ensure that the mounting screw maintains a position normal to the cover's front surface while allowing for some movement along the long axis for engagement. Certain embodiments include a mounting screw that is designed with a reduced shank. This reduction in shank diameter can be used as part of the captive feature. In certain embodiments, once fully inserted into the plastic clip the shoulder created by reducing the shank prevents the screw from moving backwards.

Certain embodiments include slots designed to allow the shaft dimension of the clip to contract enough to snap the clip into the cover hole. In certain embodiments, once it has been snapped onto the cover the slots allow the shaft diameter to open up enough to allow the screw to be inserted.

Certain embodiments can be used with electrical panels, low voltage switchboards, power products, universal enclosers, installations, connections, and/or power distribution systems. Use with any suitable fastening arrangement and/or with any suitable structures are contemplated herein.

Embodiments improve the mechanical fastening of the covers, e.g., for a low voltage switchboard, panelboard, or any other electrical equipment enclosure. Certain embodiments of an assembly include a special screw with a reduced shank profile and a specially designed plastic clip that secures to the covers, aligns the screws normal to the cover surface, and retains the screw. Certain embodiments of an assembly are also designed to meet several industrial design parameters for appearance and user interaction.

When installing covers with captive screws the most challenging aspect is keeping the screws perpendicular to the cover and maintaining alignment with the mounting hole on the enclosure. If the screws are not maintained in this position they often become entrapped at an undesirable angle between the cover and the enclosure. Certain embodiments are designed to minimize the screw's rotation away from this perpendicular position. Certain embodiments can also allow for some axial movement of the screw before the engagement with the enclosure. Embodiments can be much more cost effective than traditional solutions where welding was required to recess the screw heads below the cover surface. Certain embodiments of a system include a sheet metal emboss on the cover (e.g., the first/front structure).

Certain embodiments include a clip designed to be first inserted into the cover, this requires that the plastic clip's shaft contract a certain amount in order to snap into the hole. Once the clip has been secured to the sheet metal cover, a fastener (e.g., a screw) as disclosed herein can then be inserted through the clip. In certain embodiments, this insertion requires that the plastic clip's shaft to then expand to allow the screw to pass through until the reduced shank portion of the screw is reached. In certain embodiments, once this state is reached, the screw can then be held captive and positioned perpendicular to the cover. The screws length and reduced shank can be optimized to ensure proper engagement with the enclosure mounting hole but allow enough play for misalignment or tolerance related issues. One having ordinary skill in the art knows how to dimension the shank accordingly in view of this disclosure and the system the assembly is to be applied to.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fastening assembly for attaching a first structure to a second structure located at least partially behind the first structure, the assembly comprising:
    a clip configured to insert into an opening in the first structure in an axial direction, wherein the clip is configured to engage the first structure upon being inserted into the opening of the first structure in the axial direction such that the clip is axially retained to the first structure, the clip comprising:
    a base portion; and
    a snap-fit shaft extending from the base portion in the axial direction, the snap-fit shaft including a first leaf-spring member and a second leaf-spring member separated by one or more slots to allow the first leaf-spring member and second leaf-spring member to flex relative to each other;
    wherein the clip defines a passthrough channel; and
    a fastener configured to insert through the passthrough channel to extend beyond the clip in the axial direction to mate with a mating portion of the second structure, the fastener including a head and a shank portion extending from the head, wherein the head is recessed within the base portion;
    wherein the clip and fastener are configured such that the first leaf-spring member and the second leaf-spring member of the clip axially limit a motion of the fastener when the fastener is advanced through the passthrough channel beyond a threshold insertion position to captively retain the fastener and prevent backing out of the fastener.

2. The fastening assembly of claim 1, wherein the base portion is configured to abut the first structure at the opening in the first structure, and the snap-fit shaft is configured to extend through the opening in the first structure to extend beyond the first structure in the axial direction.

3. The fastening assembly of claim 1, wherein the snap-fit shaft includes an outer ramp formed from and/or extending outwardly from each of the first and second leaf spring member, each outer ramp configured to contact the first structure upon being inserted through the opening to cause respective leaf spring members to flex inwardly upon being inserted through the opening.

4. The fastening assembly of claim 3, wherein each outer ramp is positioned to allow a respective leaf spring member to snap outwardly when advanced beyond the first structure.

5. The fastening assembly of claim 4, wherein each outer ramp has a slope defining a proximal wall, wherein a pocket is formed between the proximal wall of each outer ramp and the base portion, the pocket configured to receive a wall of the first structure to secure the clip to the wall.

6. The fastening assembly of claim 5, wherein the snap-fit shaft includes a reducing inner dimension between a proximal portion and a distal portion such that the snap-fit shaft includes at least a first inner dimension and a second inner dimension located distal of the first inner dimension, the second inner dimension being smaller than the first inner dimension.

7. The fastening assembly of claim 6, wherein the shank portion has a first outer dimension, and a distal end portion of the fastener has a second outer dimension, and wherein the second outer dimension is larger than the second inner dimension such that insertion of the fastener through the snap-fit shaft causes an outward flex of the snap-fit shaft until the fastener is moved to or beyond the threshold insertion position.

8. The fastening assembly of claim 7, wherein the snap-fit shaft is configured to move back when the fastener is inserted to or beyond the threshold insertion position to create an axial backstop for the distal end portion of the fastener to captively retain the fastener and prevent backing out of the fastener.

9. The fastening assembly of claim 8, wherein the first outer dimension is equal to or less than the second inner dimension.

10. The fastening assembly of claim 9, wherein the head of the fastener is larger than the passthrough channel and contacts the base portion of the clip at a maximum insertion of the fastener into the passthrough channel.

11. The fastening assembly of claim 10, wherein the shank portion of the fastener is longer than the snap-fit shaft such that the shank portion extends beyond the snap-fit shaft in the axial direction.

12. The fastening assembly of claim 11, wherein each leaf-spring member includes an inner ramp defined between the first inner dimension and the second inner dimension of the snap-fit shaft.

13. The fastening assembly of claim 12, wherein each inner ramp is distally located relative to the outer ramp.

14. The fastening assembly of claim 13, wherein the distal portion of the fastener includes a distally extending ramp shape configured to contact the inner ramp of each leaf spring member.

15. The fastening assembly of claim 14, wherein the fastener includes threading on the distal portion proximal to the distally extending ramp shape configured to mesh with receiving threads of the mating portion of the second structure, wherein the shank portion and/or the distally extending ramp shape is smooth.

16. The fastening assembly of claim 2, wherein the base portion of the clip includes a bowl shape conformal to a recess in the first structure.

17. The fastening assembly of claim 1, wherein the clip is made of a flexible and/or electrically insulating material, wherein the fastener is made of metal.

18. A clip for a fastening assembly, the clip configured to insert into an opening in a first structure in an axial direction, the clip comprising:

a base portion;

a snap-fit shaft extending from the base portion in the axial direction to a distal end, the snap-fit shaft including a first leaf-spring member and a second leaf-spring member separated by one or more slots to allow the first leaf-spring member and second leaf-spring member to flex relative to each other; and a first outer ramp extending from an exterior side of the first leaf-spring member and a second outer ramp extending from an exterior side of the second leaf-spring member, the first outer ramp and the second outer ramp configured to contact the first structure upon being inserted through the opening to cause the first leaf-spring member and the second leaf-spring member to flex inwardly upon being inserted through the opening;

wherein the first outer ramp and the second outer ramp are spaced towards the base portion from the distal end; and wherein the clip is configured to engage the first structure upon being inserted into the opening of the first structure in the axial direction such that the clip is axially retained to the first structure, the clip defining a passthrough channel, wherein the clip is configured such that the distal end of the snap-fit shaft axially limits a motion of a fastener when a fastener is advanced through the passthrough channel beyond a threshold insertion position to captively retain the fastener and prevent backing out of the fastener.

19. A fastening assembly for attaching a first structure to a second structure located at least partially behind the first structure, the assembly comprising:

a clip configured to insert into an opening in the first structure in an axial direction, wherein the clip is configured to engage the first structure upon being inserted into the opening of the first structure in the axial direction such that the clip is axially retained to the first structure, the clip defining a passthrough channel and the clip comprising:

a base portion; and a snap-fit shaft extending from the base portion to a distal end, the snap-fit shaft extending in the axial direction;

wherein an exterior diameter at the distal end is a smallest exterior diameter of the snap-fit shaft; and wherein the snap-fit shaft includes a reducing inner dimension between a proximal portion of the snap-fit shaft and a distal portion of the snap-fit shaft such that an inner dimension of the distal portion is less than an inner dimension of the proximal portion, and wherein the proximal portion is between the distal portion and the base portion; and a fastener configured to insert through the passthrough channel to extend beyond the clip in the axial direction to mate with a mating portion of the second structure;

wherein the clip and fastener are configured such that the clip axially limits a motion of the fastener when the fastener is advanced through the passthrough channel beyond a threshold insertion position to captively retain the fastener and prevent backing out of the fastener.

* * * * *